United States Patent Office 3,438,724
Patented Apr. 15, 1969

3,438,724
MANUFACTURE OF CHROMIUM SPINELS
Winslow H. Hartford, Manlius, and Walter R. Kelly, Geddes, N.Y., assignors to Allied Chemical Corporation, New York, N.Y., a corporation of New York
No Drawing. Filed Mar. 12, 1964, Ser. No. 351,544
Int. Cl. C01g 49/00, 37/00; C04b 35/42
U.S. Cl. 23—56
16 claims

ABSTRACT OF THE DISCLOSURE

Chromium spinels of the formula $X(Cr_nY_{1-n})_2O_4$ where X is one of the divalent metals magnesium, cobalt, manganese, nickel, iron, copper or zinc, Y is one of the trivalent metals aluminum, manganese, cobalt, iron, titanium or vanadium and $n$ has a value greater than 0 up to and including 1 are prepared. The process comprises igniting a finely divided mixture containing oxide-yielding compounds of the divalent and trivalent metals, an alkali metal chromate and sulfur to initiate a self-sustaining reaction which yields a fused mass containing the spinel and by-product alkali metal sulfate. The by-product sulfate has been found to promote the reaction and contribute to optimum yields of the spinel product.

---

This invention relates to production of chrominum compounds, and more particularly to new and improved process for manufacture of chromium spinels.

The chromium spinels which are also known as spinel metal chromites are those chromium compounds generally represented by the formula:

$$X(Cr_nY_{1-n})_2O_4$$

wherein X is a divalent spinel metal selected from the group consisting of magnesium, cobalt, manganese, nickel, iron, copper and zinc; Y is a trivalent metal selected from the group consisting of aluminum, manganese, cobalt, iron, vanadium and titanium; and $n$ is a numerical value greater than 0 up to and including 1.0. When the value of $n$ in the above general formula is less than 1.0 the chromium compound is generally referred to as a mixed chromium spinel. When the value of $n$ is equal to one the result is a chromium spinel of the more common form represented by the formula:

$$XCr_2O_4 \quad (2)$$

Chromium-containing compounds have long been desired for a variety of applications, for example, as ceramic and refractory materials for which they are particularly well suited because of their combined properties of good chemical neutrality, resistance to erosion by slag, and high melting point. Many chromium compounds also have good coloring properties. Among such ceramic and refractory materials are the natural chromite ores and various chromium oxides. Recently, however, the increasing demands of modern technology have created the need for improved ceramic and refractory materials. For example, the natural chromite ores have been found subject to limitations when used under the more severe conditions encountered in oxygen refining of steel and in the melting of special cast ceramic materials. One approach to overcoming the modern day deficiencies of the conventional refractory materials is by the addition of chromium values to increase the total chromium content of these materials. For example, chromium oxides have been proposed as additives for the chromite ores to increase refractory properties. However, the addition of the ordinary chromium oxides resulted in an excess of these materials in the final product, which excess was found to be volatile at high temperatures. The materials found ideally suited for upgrading the refractory and ceramic capability of the chromite ores in such situations are the chromium spinels.

Unfortunately, the prior art procedures for preparing the chromium spinels have been inefficient and relatively expensive which has resulted in a limitation in the use of these valuable materials. Heretofore, conventional methods for preparing the chromium spinels have involved the heating of an oxide or hydroxide of the desired spinel metal with chromic oxide in the presence of a mineralizer such as a lead salt or a borate. For example, the magnesium-chromium spinel, $MgCr_2O_4$, is usually prepared by heating to about 1,200° C. a mixture of magnesium oxide and chromic oxide in the presence of lead oxide and/or boric oxide. The chromium spinels can also be prepared by heating to 1,100° C. such precursors as $(NH_4)_2Mg(CrO_4)_2 \cdot 6H_2O$, $MgCr_2O_7 \cdot 5H_2O$, $MnCr_2O_7 \cdot 4C_5H_5N$, $CoCr_2O_7 \cdot 4C_5H_5N$, and $(NH_4)_2Ni(CrO_4)_2 \cdot 6H_2O$. Similar precursors are used to prepare copper, zinc and iron spinels, but either long times or very high temperatures and special atmospheres are used. One disadvantage of such conventional methods is that they start with a relatively expensive source of chromium. External heating of the reaction as commonly carried out also adds to cost of product. Further, substantial amounts of unrecoverable mineralizer must be added to achieve proper reaction. Together, these characteristics of the conventional chromium spinel processes have made their utilization from a cost standpoint relatively unattractive and there has long been a need for a more efficient method.

An object of the present invention is to provide a new and improved process for production of chromium spinels.

Another object of the invention is to provide a more economical process for preparing chromium spinels employing a relative low cost source of chromium as starting material.

A further object of the invention is to provide an improved more efficient process for manufacture of chromium spinels in which the need to separately include a mineralizing substance in the starting reaction mixture is eliminated.

Other objects and advantages will be evident from the following description of the invention.

In accordance with the present invention it has been found that chromium spinels are readily produced in high yields by ignition of an intimate finely divided mixture containing (a) a spinel metal oxide-bearing compound selected from the group consisting of spinel metal oxides and spinel metal oxide-yielding materials, (b) an alkali metal chromate selected from the group consisting of alkali metal chromates and alkali metal dichromates, preferably sodium dichromate, and (c) from about a stoichiometric amount to about a 75% excess of sulfur, preferably sulfur in amount of about 10–50% in excess of the stoichiometric requirements. The indicated reactants upon ignition rapidly form a by-product alkali metal sulfate which has been surprisingly found to promote the reaction and production of the chromium spinel in high yield and in a technically pure condition. The reaction is exothermic and may be rapidly carried out on a self-sustaining basis to form a fused mass which after cooling may be treated by simple digestion or other procedures to recover the desired chromium spinel product.

It has been also found in accordance with the invention that spinel formation and yields are unexpectedly enhanced when the reactants are employed in both the anhydrous and hydrous form such that the reaction mixture contains the equivalent of about 0.5 to 5.0% water by total weight.

The spinel metals are the divalent metals selected from the group consisting of magnesium, cobalt, manganese, nickel, iron, copper and zinc. A spinel metal oxide-bearing compound as used herein is meant to designate a spinel metal oxide or other compound yielding a divalent spinel metal oxide on heating at elevated temperature. Materials which yield the spinel metal oxide and thus may be used in make-up of the starting mixture of reactants include the spinel metal hydroxides, carbonates, nitrates, and salts of oxyacids such as sulfates, oxalates, acetates, formates, chlorates, and perchlorates. The latter two may be of value in contributing to the heat of reaction, but are to be used with care because of their high exothermic values.

Examples of spinel metal oxides and oxide-yielding materials which may be employed in the invention are as follows: magnesium oxide, cobaltous oxide, manganese oxide, nickel oxide, ferric oxide, cuprous oxide, zinc oxide, magnesium hydroxide, cobaltous hydroxide, maganese hydroxide, nickel hydroxide, ferric hydroxide, cuprous hydroxide, zinc hydroxide, magnesium nitrate, cobaltous nitrate, manganese nitrate, nickel nitrate, ferric nitrate, zinc nitrate, magnesium carbonates, cobaltous carbonates, manganese carbonates, nickel carbonates, zinc carbonates, ferrous carbonate, magnetic iron oxide, cobaltocobaltic oxide, manganese dioxide, nickelic oxide, cupric oxide, cupric nitrate, cupric carbonates, magnesium sulfate, cobaltous sulfate, manganese sulfate, nickel sulfate, ferrous sulfate, ferric sulfate, cupric sulfate, zinc sulfate, magnesium oxalate, cobaltous oxalate, manganese oxalate, nickel oxalate, ferrous oxalate, zinz oxalate, cupric oxalate, magnesium acetate, cobaltous acetate, manganese acetate, nickel acetate, ferrous acetate, ferric acetate, cupric acetate, zinc acetate, magnesium formate, cobaltous formate, manganese formate, nickel formate, ferrous formate, cuprous formate, zinc formate. Also, magnesium chlorate, cobaltous chlorate, nickel chlorate, cupric chlorate, magnesium perchlorate, cobaltous perchlorate, nickel perchlorate, ferric perchlorate, cupric perchlorate, manganese perchlorate, and zinc perchlorate. The preferred material is the spinel metal oxide which is usually of low cost and subject to nearly complete reaction with the other constituents of the starting mixture to form the desired chromium spinel. The oxides also produce a highly exothermic reaction resulting in rapid formation of the chronium spinel. When the oxide-yielding materials are used they are selected largely on cost advantage and ability to produce the more exothermic reaction with the other particular constituents of the starting mixture. Other preferred oxide-yielding compounds in decreasing order of desirability based on general capacity for exothermic reaction are the nitrates, hydroxides, and carbonates.

The alkali metal chromates employed in make-up of the starting mixture should be principally in the anhydrous form in order to obtain the more exothermic reaction. However, it has been unexpectedly found that the reaction and product yield benefit when at least some portion of one or more of the reactants are in hydrous form sufficient to supply the equivalent of about 0.5 to 5.0% by weight water in the reaction mixture, preferably between about 0.6 to 2.0% by weight water. Usually, about 0.5% hydrous water by total weight of the reaction mixture is required to be effective in improving the reaction while an amount of the water in excess of about 5.0% is unnecessary and tends to interfere with ignition of the reaction. In carrying out the process of the invention it is therefore preferred to supply the chromate requirements in both anhydrous and hydrated form such that about 5–35% by weight, preferably 10–25%, of the total requirements are present in the form of the hydrate. The preferred hydrates are the alkali metal dichromate dihydrates, e.g., $Na_2Cr_2O_7 \cdot 2H_2O$. When employing the alkali metal monochromates in the hydrate form either the tetra-, hex,-, or deca-hydrates may be used with suitable adjustment in the amount of hydrate based on the total amount of water introduced into the starting mixture. Thus, when employing the tetrahydrate of sodium chromate, $Na_2CrO_4 \cdot 4H_2O$, the amount of the hydrate preferably represents less than about 25% by weight of the total amount of chromate supplied, desirably between about 10–15% of the total weight of the monochromate. Mixtures of the monochromates and dichromates may be employed, if desired. However, it is generally preferred to employ only the dichromates in the starting mixture as these materials produce undiluted amounts of by-product alkali metal sulfate mineralizer. Alteratively, if the spinel-forming divalent metal compound is hydrated or yields water on its decomposition, this water can be substituted partly or completely for the water derived from the hydrated chromate or dichromate used.

The use of sulfur in the starting mixture has been found to be a particularly desirable and important feature of the invention as it forms a by-product alkali metal sulfate which has been found unexpectedly to promote the reaction and contribute to optimum yields of the product. The action of the by-product alkali metal sulfate in promoting the reaction is such that the extraneous addition of costly mineralizing substances is unnecessary and may be dispensed with, if desired. The actual amount of sulfur employed may vary fairly widely from about 80% of the stoichiometric requirements up to about 200% of the stoichiometric amount, more usually from about the stoichiometric amount up to about 175% of such amount. Best results are obtained when at least about a 10% excess of sulfur is employed, with an excess of between about 10–15% being generally preferred.

In carrying out the invention the spinel metal oxide-bearing material and alkali metal chromate are admixed in approximately stoichiometric proportions along with the desired amount of sulfur. Variation from the stoichiometric proportions by more than 30% is generally undesirable. The actual proportioning of the starting mixture based on the stoichiometric requirements will vary depending upon the desired spinel product and the requirements for the particular reaction by which the reactants selected form the product. The actual requirements will be evident from the following equations, which illustrate reactions which may be involved in carrying out the invention for the production of chromium spinels:

$$MgO + Na_2Cr_2O_7 + S \rightarrow MgCr_2O_4 + Na_2SO_4 \quad (3)$$
$$CoO + 2Na_2CrO_4 + S \rightarrow CoCr_2O_4 + Na_2SO_4 + Na_2O \quad (4)$$
$$Mg(OH)_2 + Na_2Cr_2O_7 + S \rightarrow MgCr_2O_4 + Na_2SO_4 + H_2O \quad (5)$$
$$MgCO_3 + Na_2Cr_2O_7 + S \rightarrow MgCr_2O_4 + Na_2SO_4 + CO_2 \quad (6)$$
$$Mg(NO_3)_2 + Na_2Cr_2O_7 + 7/2 S \rightarrow MgCr_2O_4 + Na_2SO_4 + 5/2 SO_2 + N_2 \quad (7)$$

Preparation of a mixed chromium spinel in accordance with the invention is illustrated by the following equation:

$$5MgO + Al_2O_3 + 4Na_2Cr_2O_7 + 4S \rightarrow 4Na_2SO_4 + 5Mg(Cr_{0.8} \cdot Al_{0.2})_2O_4 \quad (8)$$

The mixed chromium spinels may therefore be prepared in accordance with the invention by including in the starting mixture approximately the required stoichiometric amount of a trivalent metal selected from the group consisting of aluminum, manganese, cobalt, iron, vanadium and titanium. The actual amounts of the trivalent metal and chromate employed may vary fairly widely depending upon the desired proportion of the trivalent metal and chromium within the mixed spinel product. In supplying the trivalent metal the same oxide-bearing materials may be used as employed in supplying the divalent spinel metal. Thus, both oxides of the trivalent metal and materials which yield these oxides on heating may be used. Examples of the trivalent metal oxide-bearing compounds which may be employed are as follows: aluminum oxide, ferric oxide, cobalt oxide, manganic oxide, titanium oxide, vanadium oxide, aluminum hydroxide, ferric hydroxide, cobalt hydroxide, manganic hydroxide, aluminum nitrate, ferric nitrate, aluminum carbonate, manganese dioxide, aluminum sulfate and ferric sulfate. The preferred material is the oxide of trivalent metal.

In preparing the chromium spinels the reactants are intimately admixed and charged to a suitable container such as a heavy heat-resistant metal or ceramic vessel. All reactants are preferably finely divided with a particle size less than about 20 standard mesh. Desirably, the reactants are pulverulent with particle size less than about 80 standard mesh. The reaction may be readily initiated by flame ignition, or by use of suitable chemical fuse mixture, for example, a mixture of sulfur and chromic acid which may be fired by addition of alcohol. The reaction is highly exothermic and may be carried out on a self-sustaining basis without extraneous heating. As the reaction proceeds beyond ignition the entire reaction mixture is rapidly heated to a fused or sintered mass with the product uniformly admixed with the by-product molten alkali metal sulfate which promotes the formation of the desired chromium spinel in high yields. When the indicated minor portion of the chromate requirement is present in the form of the hydrate the higher yields are obtained indicating some facilitation of the reaction by which the spinel is formed. The reason for improvement when the hydrate is present in the starting mixture is not known with certainty. Oxygen may be excluded from the reaction zone but this is generally not necessary in order to obtain good results. Termination of the reaction is usually evidenced by cessation of sulfur flames after which the mass is allowed to cool to about ambient temperature. During cooling it is usually desirable to exclude air to avoid reoxidation of some chromium. Upon cooling, there is formed a hard solid mass in which the chromium spinel product is dispersed in the by-product alkali metal sulfate. The product may be readily recovered by breaking up the hardened mass and dissolving the water-soluble metal sulfate by conventional water digestion in a suitable container such as an ordinary leaching tank. After digestion the resulting slurry is filtered and the solid chromium spinel product separated from the liquor. The product may then be dried and recovered, preferably after washing to insure removal of the sulfate. The product after washing is of technical purity with only minor amounts of water insoluble impurities which are mainly unreacted oxide and chromic oxide formed during the reaction by decompositoin of the chromate or dichromate. The unreacted spinel metal oxide may be removed from the product by washing with a dilute mineral acid, preferably HCl or $H_2SO_4$. If desired, the water washing and acid washing treatments may be combined during the digestion and the recovery simplified. Recovery of the chromium spinels based on the chromium in the starting materials is generally at least about 80%, more usually about 90%. Product purity is generally at least about 75%, with values as high as 80%, and higher, being readily obtained.

The following examples demonstrate the practice and advantages of the present invention:

EXAMPLE 1

An intimate dry mixture was formed by admixing in a conical mixer about 400 grams of magnesium oxide, about 2,620 grams of sodium dichromate, and about 320 grams of sulfur. All reactants were finely divided having a particle size less than about 60 standard mesh. The mixture of reactants contained the magnesium oxide and sodium dichromate in mol ratio of about 1 to 1 or in about the stoichiometric portions required to form from the reactants the magnesium chromium spinel, $$MgCr_2O_4$$

The amount of sulfur in the starting mixture also represented about the stoichiometric amount required to form the magnesium chromium spinel. The mixture of reactants was then charged to a 5,000 cc. capacity heavy heat-resistant retort and ignited by a fuse mixture of 50 g. $CrO_3+16$ g. sulfur. Upon ignition a vigorous exothermic reaction occurred heating the entire mixture rapidly to a fused mass at red heat. The reaction was observed to cease after about 3 minutes as indicated by the cessation of sulfur flames and a gradual drop in temperature. The fused mass after cessation of the reaction was allowed to cool to about room temperature. There was formed on cooling a solid hard mass which was broken up into large particles averaging about ½" in diameter by a jaw crusher. The resulting particle mass was then placed in a steel leaching tank and digested under moderate agitation with about 10 kilograms of hot (ca. 80° C.) water for about 60 minutes until all particles had been disintegrated. The resulting slurry was then slowly filtered using a vacuum filter. The filter cake was washed with about 10 kilograms of water and dried over the course of about 16 hours at 110° C. in a steam-heated tray drier. There was recovered about 1,900 total grams of a gray-green colored powder which was shown by X-ray analysis to be largely magnesium chromite with minor amounts of magnesium oxide and chromic oxide. The product was washed with about 5,000 grams of dilute (0.5N) HCl acid to remove magnesium oxide which was found to constitute about 190 grams of the product. The product was then washed, dried and there was recovered about 1,700 grams of a gray-green colored powder shown by X-ray analysis to be principally magnesium chromite, purity about 85%. Yield of the magnesium chromite based on the magensium oxide and sodium dichromate in the starting mixture was about 88%.

EXAMPLE 2

An intimate dry mixture was formed as in Example 1 by admixing about 80.6 grams of magnesium oxide, about 532 grams of sodium dichromate, and about 64 grams of sulfur. All reactants were finely divided having a particle size less than about 40 standard mesh. The mixture of reactants contained the magnesium oxide and sodium dichromate in mol ratio of about 1 to 1. The total amount by weight of sodium dichromate included about 11.3% by weight of sodium dichromate hydrate ($Na_2Cr_2O_7 \cdot 2H_2O$). The amount of sulfur in the starting mixture represented about the stoichiometric amount required to form the magnesium chromium spinel. The mixture of reactants was then charged to a 2,000 cc. capacity heavy heat-resistant retort and ignited by a fuse mixture of 10 g. $CrO_3$ and 3.2 g. sulfur. Upon ignition a vigorous exothermic reaction occurred heating the entire mixture rapidly to a fused mass at red heat. The reaction was observed to cease after about 3 minutes as indicated by cessation of deflagration and gradual cooling. The fused mass after cessation of the reaction was allowed to cool to about room temperature overnight. There was formed on cooling a solid hard mass which was ground to pass 20 mesh by a hammer mill. The resulting particle mass was then placed in a 4 liter beaker and digested under moderate agitation with about 3,000 grams of water for about 60 minutes until all particles had been disintegrated. The resulting slurry was then slowly filtered using a Buchner filter. The filter cake was washed with about 6,000 grams of water and dried over the course of about 3 hours at 110° C. by drying in an oven. There was recovered about 337 total grams of a gray-green colored powder which was shown by X-ray analysis to be largely magnesium chromite with minor amounts of magnesium oxide and chromic oxide. The product was then washed with about 2,000 grams of dilute sulfuric acid to remove magnesium oxide which was found to constitute about 14 grams of the product. The product was then washed, dried and there was recovered about 323 grams of a gray-green colored powder shown by X-ray analysis to be mainly magnesium chromite, with some chromite oxide, purity about 80%. Yield of the magnesium chromite based on the magnesium oxide and sodium dichromate in the starting mixture was about 84%.

EXAMPLE 3

An intimate dry mixture was formed as in Example 1 by admixing about 202 grams of magnesium oxide, about 1,328 grams of sodium dichromate, and about 200 grams of sulfur. All reactants were finely divided having a particle size less than about 60 standard mesh. The mixture of reactants contained the magnesium oxide and sodium dichromate in mol ratio of about 1 to 1. The total amount by weight of sodium dichromate included about 11.3% by weight of sodium dichromate hydrate ($Na_2Cr_2O_7 \cdot 2H_2O$). The amount of sulfur employed represented about a 25% excess of the amount theoretically required to form the magnesium chromium spinel. The mixture of reactants was then charged to a 2,000 cc. capacity heavy heat-resistant retort and ignited by a fuse consisting of 10 g. $CrO_3$ and 3 g. S. Upon ignition a vigorous exothermic reaction occured heating the entire mixture rapidly to a fused mass at red heat. The reaction was observed to cease after about 4 minutes as indicated by ceasing of fumes and gradual cooling. The fused mass after cessation of the reaction was allowed to cool to about room temperature overnight. There was formed on cooling a solid hard mass which was ground into 20 mesh powder with a hammer mill. The resulting particle mass was then placed in a steel leaching tank and digested under moderate agitation with about 4,000 grams of water for about 60 minutes until all particles had been disintegrated. The resulting slurry was then slowly filtered using a larger Buchner filter. The filter cake was washed with about 4,000 grams of water and dried over the course of about 16 hours at 135° C. by drying in an oven. There was recovered about 974 total grams of a gray-green colored powder which was shown by X-ray analysis to be largely magnesium chromite with minor amounts of magnesium oxide and chromic oxide. Yield of the magnesium chromite based on the magnesium oxide and sodium dichromate in the starting mixture was about 98.6%.

EXAMPLE 4

An intimate dry mixture was formed as in Example 1 by admixing in a conical mixer about 803 grams of cobalt oxide $Co_3O_4$, about 2,656 grams of sodium dichromate, and about 400 grams of sulfur. All reactants were finely divided having a particle size less than about 60 standard mesh. The mixture of reactants contained the cobalt oxide and sodium dichromate in mol ratio of about 1 to 1 or in about the stoichiometric portions required to form from the reactants the cobalt chromium spinel, $CoCr_2O_4$. The total amount by weight of sodium dichromate included about 11.2% by weight of sodium dichromate hydrate ($Na_2Cr_2O_7 \cdot 2H_2O$). The amount of sulfur employed represented about a 25% excess of the amount theoretically required to form the cobalt chromium spinel. The mixture of reactants was then charged to to a 5,000 cc. capacity heavy heat-resistant retort and ignited by a fuse mixture of 25 g. $CrO_3$ and 8 g. sulfur. Upon ignition a vigorous exothermic reaction occurred heating the entire mixture rapidly to a fused mass at red heat. The reaction was observed to cease after about 5 minutes as indicated by cessation of $SO_2$ fumes and gradual cooling. The fused mass after cessation of the reaction was allowed to cool to about room temperature over the course of about 16 hours. There was formed on cooling a solid hard mass which was broken up into large particles averaging about ¼″ in diameter by a jaw crusher. The resulting particle mass was then placed in a steel leaching tank and digested under moderate agitation with about 10 kilograms of water for about 60 minutes until all particles had been disintegrated. The resulting slurry was then slowly filtered using a vacuum filter. The filter cake was washed with about 10 kilograms of water and dried over the course of about 24 hours at 120° C. in a steam-heated tray drier. There was recovered about 2,110 total grams of a turquoise-blue colored powder which was shown by X-ray analysis to be largely cobalt chromite with minor amounts of cobaltous oxide and chromic oxide. The product was then washed with about 10 kilograms of dilute sulfuric acid to remove cobalt oxide which was found to constitute about 110 grams of the product. The product was then washed, dried and there was recovered about 2,000 grams of a turquoise-blue colored powder shown by X-ray analysis to be substantially entirely cobalt chromite, purity about 92%. Yield of the cobalt chromite based on the cobalt oxide and sodium dichromate in the starting mixture was about 88%.

Although certain preferred embodiments of the invention have been disclosed for purpose of illustration, it will be evident that various changes and modifications may be made therein without departing from the scope and spirit of the invention.

We claim:

1. A process for the manufacture of a chromium spinel of the formula:

$$X(Cr_nY_{1-n})_2O_4$$

wherein X is a di-valent spinel metal selected from the group consisting of magnesium, cobalt, manganese, nickel, iron, copper and zinc; Y is a tri-valent metal selected from the group consisting of aluminum, manganese, cobalt, iron, titanium and vanadium; and $n$ is a numerical value greater than 0 up to and including 1.0; said process comprising forming an intimate finely divided mixture containing (a) a spinel metal oxide-yielding compound; (b) an alkali metal chromate selected from the group consisting of alkali metal chromates and alkali metal dichromates; (c) sulfur; and when $n$ is less than one (d) a tri-valent metal oxide-yielding compound; igniting said mixture to an elevated temperature sufficient to form the chromium spinel and by-product alkali metal sulfate by reaction of said spinel metal oxide-yielding compound, alkali metal chromate, said trivalent metal oxide-yielding compound and sulfur, and recovering the chromium spinel from the reaction mixture; said reactants (a) and (b) being present in at least about the stoichiometric amount up to about 30% in excess of that stoichiometric amount required to form the chromium spinel, said reactant (c) being present in an amount from about 80% of the stoichiometric amount up to about 200% in excess of the stoichiometric amount required to form a chromium spinel compound and said reactant (d) being present in an amount sufficient to supply the desired proportion of the trivalent metal and chromium.

2. The process of claim 1 in which the sulfur is present in the mixture in about 10–50% excess of the amount theoretically required for forming the chromium spinel.

3. The process of claim 1 in which $n$ is 1.0 and the spinel metal oxide compound is magnesium oxide.

4. The process of claim 1 in which $n$ is 1.0 and the spinel metal oxide-bearing compound is a cobalt oxide.

5. The process of claim 1 in which $n$ is 1.0 and the spinel metal oxide-bearing compound is a nickel oxide.

6. The process of claim 1 in which $n$ is 1.0 and the spinel metal oxide-bearing compound is a manganese oxide.

7. The process of claim 1 in which $n$ is 1.0 and the spinel metal oxide-bearing compound is a copper oxide.

8. The process of claim 1 wherein at least a portion of at least one of the reactants (a) and (b) being in hydrous form in an amount sufficient to supply the equivalent of about 0.5% to 5% water by total weight of the reaction mixture.

9. A process for the manufacture of a chromium spinel of the formula:

$$X(Cr_nY_{1-n})_2O_4$$

wherein X is a di-valent spinel metal selected from the group consisting of magnesium, cobalt, manganese, nickel, iron, copper and zinc; Y is a tri-valent metal selected from the group consisting of aluminum, managanese, cobalt, iron, titanium and vanadium; and $n$ is a numerical value greater than 0 up to and including 1.0; said process comprising forming a mixture containing (a) a spinel metal oxide-yielding compound; (b) an alkali metal chromate selected from the group consisting of alkali metal chromates and alkali metal dichromates, between about 5–35% by weight of the total alkali metal chromate being of the hydrate form; (c) sulfur; and when $n$ is less than one (d) a tri-valent metal oxide-yielding compound; igniting said mixture to an elevated temperature sufficient to form the chromium spinel and by-product alkali metal sulfate by reaction of said spinel metal oxide-bearing compound, alkali metal chromate, said trivalent metal oxide-yielding compound and sulfur, and recovering the chromium spinel from the reaction mixture; said reactants (a) and (b) being present in at least about the stoichiometric amount up to about 30% in excess of that stoichiometric amount required to form the chromium spinel, said reactant (c) being present in an amount from about 80% of the stoichiometric amount up to about 200% in excess of the stoichiometric amount required to form a chromium spinel compound and said reactant (d) being present in an amount sufficient to supply the desired proportion of the trivalent metal and chromium.

10. The process of claim 10 in which the sulfur is present in the mixture in about 10–50% excess of the amount theoretically required to form the chromium spinel.

11. The process of claim 10 in which $n$ is 1.0 and the spinel metal oxide-bearing compound is magnesium oxide.

12. The process of claim 10 in which $n$ is 1.0 and the spinel metal oxide-bearing compound is a cobalt oxide.

13. The process of claim 10 in which $n$ is 1.0 and the spinel metal oxide-bearing compound in a nickel oxide.

14. The process of claim 10 in which $n$ is 1.0 and the spinel metal oxide-bearing compound is a manganese oxide.

15. The process of claim 10 in which $n$ is 1.0 and the spinel metal oxide-bearing compound is a copper oxide.

16. The process of claim 10 in which the alkali metal chromate hydrate represents between about 10–25% by weight of the total alkali metal chromate in said mixture.

References Cited

UNITED STATES PATENTS

| 1,728,510 | 9/1929 | Roth | 23—145 |
| 2,209,907 | 7/1940 | Tarr | 23—145 X |
| 2,381,236 | 8/1945 | Udy | 23—56 |
| 2,544,687 | 3/1951 | Kalbach | 23—145 |

FOREIGN PATENTS 558,986  1/1944  Great Britain.

OTHER REFERENCES

Cotton et al., Advanced Inorganic Chemistry, 1962, published by Interscience Publishers, a division of John Wiley and Sons, p. 721.

HERBERT T. CARTER, *Primary Examiner.*

U.S. Cl. X.R.

106—59, 66